(12) United States Patent
Hines et al.

(10) Patent No.: US 8,966,620 B2
(45) Date of Patent: Feb. 24, 2015

(54) CAMPAIGN DETECTION

(75) Inventors: Douglas J. Hines, Kenmore, WA (US);
Mihai Costea, Redmond, WA (US);
Yuxiang Xu, Davis, CA (US); Harsh S. Dangayach, White Plains, NY (US);
Krishna Vitaldevara, Fremont, CA (US); Eliot C. Gillum, Mountain View, CA (US); Jason D. Walter, San Jose, CA (US); Aleksander R. Kolcz, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 670 days.

(21) Appl. No.: 12/789,250

(22) Filed: May 27, 2010

(65) Prior Publication Data
US 2011/0296524 A1 Dec. 1, 2011

(51) Int. Cl.
*G06F 21/55* (2013.01)

(52) U.S. Cl.
CPC .................................... *G06F 21/552* (2013.01)
USPC .................... 726/22; 726/23; 726/24; 726/25; 713/187; 713/188

(58) Field of Classification Search
CPC .................................................. H04L 63/1416
USPC ............... 726/22–25; 713/187–188, 193–194
See application file for complete search history.

(56) References Cited

U.S. PATENT DOCUMENTS

| | | | |
|---|---|---|---|
| 7,590,694 B2 | 9/2009 | Yu | |
| 7,660,665 B2 * | 2/2010 | Tamamoto et al. | 701/526 |
| 7,660,865 B2 * | 2/2010 | Hulten et al. | 709/207 |
| 7,739,337 B1 * | 6/2010 | Jensen | 709/206 |
| 7,941,490 B1 * | 5/2011 | Cowings | 709/206 |
| 8,429,232 B1 * | 4/2013 | Appenzeller et al. | 709/206 |
| 8,578,479 B2 * | 11/2013 | Gopalan et al. | 726/22 |
| 2004/0148330 A1 | 7/2004 | Alspector et al. | |
| 2004/0267886 A1 * | 12/2004 | Malik | 709/206 |
| 2009/0077182 A1 | 3/2009 | Banjara et al. | |
| 2010/0011071 A1 * | 1/2010 | Zheleva | 709/206 |
| 2010/0115040 A1 * | 5/2010 | Sargent et al. | 709/206 |
| 2010/0191819 A1 * | 7/2010 | Alspector et al. | 709/206 |

OTHER PUBLICATIONS

Haider, et al., "Bayesian Clustering for Email Campaign Detection", Retrieved at << http://www.cs.mcgill.ca/~icml2009/papers/328.pdf >>, ACM International Conference Proceeding Series, vol. 382, Proceedings of the 26th Annual International Conference on Machine Learning, Jun. 14-18, 2009, pp. 8.

(Continued)

*Primary Examiner* — Josnel Jeudy
(74) *Attorney, Agent, or Firm* — Tim Wong; Jim Ross; Micky Minhas

(57) ABSTRACT

Campaign detection techniques are described. In implementations, a signature is computed for each of a plurality of emails to be communicated by a service provider to respective intended recipients. A determination is made that two or more of the plurality of emails is similar based on the respective signatures. Responsive to a finding that a number of similar emails exceeds a threshold, an indication is output that the similar emails have a likelihood of being involved in a spam campaign.

20 Claims, 4 Drawing Sheets

(56) References Cited

OTHER PUBLICATIONS

Yih, et al., "Improving Spam Filtering by Detecting Gray Mail", Retrieved at << http://citeseerx.ist.psu.edu/viewdoc/download?doi=10.1.1.73.2373&rep=rep1&type=pdf >>, The Fourth Conference on Email and Anti-Spam, Aug. 2-3, 2007, pp. 4.

Kreibich, et al., "On the Spam Campaign Trail", Retrieved at << http://www.usenix.org/event/leet08/tech/full_papers/kreibich/kreibich.pdf >>, Proceedings of the 1st Usenix Workshop on Large-Scale Exploits and Emergent Threats, Apr. 15, 2008, pp. 9.

Hershkop, et al., "Combining Email Models for False Positive Reduction", Retrieved at <21 http://www.cs.columbia.edu/~sh553/publications/kdd05-final.pdf >>, International Conference on Knowledge Discovery and Data Mining, Proceedings of the eleventh ACM SIGKDD international conference on Knowledge discovery in data mining, Aug. 21-24, 2005, pp. 1-10.

Ma, et al., "On Extendable Software Architecture for Spam Email Filtering", Retrieved at << http://www.iaeng.org/IJCS/issues_v34/issue_1/IJCS_34_1_18.pdf >>, IAENG International Journal of Computer Science, vol. 34, No. 1, 2007, pp. 7.

Zheleva, et al., "Trusting Spam Reporters: A Reporter-based Reputation System for Email Filtering", Retrieved at << http://linqs.cs.umd.edu/basilic/web/Publications/2008/zheleva:tois08/zheleva-tois08.pdf >>, ACM Transactions on Information Systems (TOIS), vol. 27, No. 1, Dec. 2008, pp. 1-37.

Haider, et al., "Bayesian Clustering for Email Campaign Detection", Retrieved at <<http://www.cs.mcgill.ca/~icmll2009/papers/328.pdf >>, ACM International Conference Proceeding Series, vol. 382, Proceedings of the 26th Annual International Conference on Machine Learning, Jun. 14-18, 2009, pp. 8.

Yih, et al., "Improving Spam Filtering by Detecting Gray Mail", Retrieved at <<http://citeseerx.ist.psu.edu/viewdoc/download?doi=10.1.1.73.2373&rep=rep1&type=pdf >>, The Fourth Conference on Email and Anti-Spam, Aug. 2-3, 2007, pp. 4.

Kreibich, et al., "On the Spam Campaign Trail", Retrieved at <<http://www.usenix.org/event/leet08/tech/full_papers/kreibich/kreibich.pdf >>, Proceedings of the 1st Usenix Workshop on Large-Scale Exploits and Emergent Threats, Apr. 15, 2008, pp. 9.

Hershkop, et al., "Combining Email Models for False Positive Reduction", Retrieved at <<http://www.cs.columbia.edu/~sh553/publications/kdd05-final.pdf >>, International Conference on Knowledge Discovery and Data Mining, Proceedings of the eleventh ACM SIGKDD international conference on Knowledge discovery in data mining, Aug. 21-24, 2005, pp. 1-10.

Ma, et al., "On Extendable Software Architecture for Spam Email Filtering", Retrieved at <<http://www.iaeng.org/IJCS/issues_v34/issue_1/IJCS_34_1_18.pdf >>, IAENG International Journal of Computer Science, vol. 34, No. 1, 2007, pp. 7.

Zheleva, et al., "Trusting Spam Reporters: A Reporter-based Reputation System for Email Filtering", Retrieved at <<http://linqs.cs.umd.edu/basilic/web/Publications/2008/zheleva:tois08/zheleva-tois08.pdf, ACM Transactions on Information Systems (TOIS), vol. 27, No. 1, Dec. 2008, pp. 1-37.

\* cited by examiner

CAMPAIGN DETECTION

BACKGROUND

Unsolicited email, which is commonly referred to as "spam," continues to be a problem both to service providers as well as recipients of the email. For example, service providers may waste valuable resources communicating these emails over a network. Additionally, users may then be confronted with these emails which may hinder interaction of the user with "legitimate" email and thus lead to user frustration. Further, the user may form a negative opinion of the service provider as a result of this frustration.

The sophistication of spammers is also increasing in an attempt to defeat traditional techniques there were employed to combat spam. Therefore, these traditional techniques may be insufficient when confronted with the ever changing techniques that spammers may use to "get around" spam filters.

SUMMARY

Campaign detection techniques are described. In implementations, a signature is computed for each of a plurality of emails to be communicated by a service provider to respective intended recipients. A determination is made that two or more of the plurality of emails is similar based on the respective signatures. Responsive to a finding that a number of similar emails exceeds a threshold, an indication is output that the similar emails have a likelihood of being involved in a spam campaign.

In implementations, a determination is made that a plurality of user accounts has attempted to communicate similar emails. Responsive to the determination, reputation information is obtained that is associated with one or more of the plurality of user accounts. The reputation information is used to determine a likelihood of whether the similar emails are part of a spam campaign.

In implementations, a plurality of signatures is computed for an email, each of the signatures corresponding to a respective portion of the email. The plurality of signatures is compared to other signatures computed for other portions of other emails. A determination is then made as to a similarity of the emails, one to another, based on the comparison. Responsive to the determination, reputation information is obtained that is associated with user accounts that correspond to the similar emails. The reputation information is used to determine a likelihood of whether the similar emails are part of a spam campaign and a result is output.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

The sophistication of spammers is ever increasing. Therefore, traditional techniques that were developed to combat spammers may become inefficient. For example, typical anti-spam filters involve training, which may include manual and/or machine learning to separate legitimate email from unsolicited email (i.e., spam). However, it may take time to perform the training, which may make anti-spam systems vulnerable during this time. Consequently, spammers may attempt to exploit this vulnerability, such as by sending out a "burst" of spam over this period of time. This may result in consumption of valuable resources of a service provider as well as frustration to users of the system.

Campaign detection techniques are described. In implementations, techniques are described to generate signatures that describe emails that are to be sent and/or have been sent by a service provider. The signatures may be generated in a variety of ways, such as based on one or more keywords or other content included in the emails. The signatures may then serve as a basis to compute similarity of the emails, one to another. A determination of a number of similar emails that are to be sent may then serve as a basis of investigating a likelihood of whether the similar emails are part of a spam campaign. Thus, these techniques may leverage similarity of the emails as opposed to whether the emails include "good" or "bad" content. In this way, the campaign detection techniques may work with "graded" and "ungraded data" and thus may be employed by an outbound system as opposed to traditional techniques that relied on grading.

In implementations, the techniques may also include a mechanism to verify whether the similar emails are part a spam campaign and therefore reduce false positive results. For instance, the techniques may leverage information describing user accounts that are being used to communicate the similar emails. A variety of different information may be employed, such as reputation information, geographic information that describes a location from which a user logged in to the user account, and so on. Therefore, these techniques may differentiate between legitimate similar email (e.g., chain letters, marketing communication, people sending links to popular content) and unsolicited email. Further discussion of the campaign detection techniques may be found in relation to the following sections.

In the following discussion, an example environment is first described that is operable to perform campaign detection techniques. Example procedures are then described, which may be employed in the example environment as well as in other environments, and vice versa. Accordingly, performance of the example procedures is not limited to the example environment and the example environment is not limited to performance of the example procedures.

Example Environment

Figure 1:
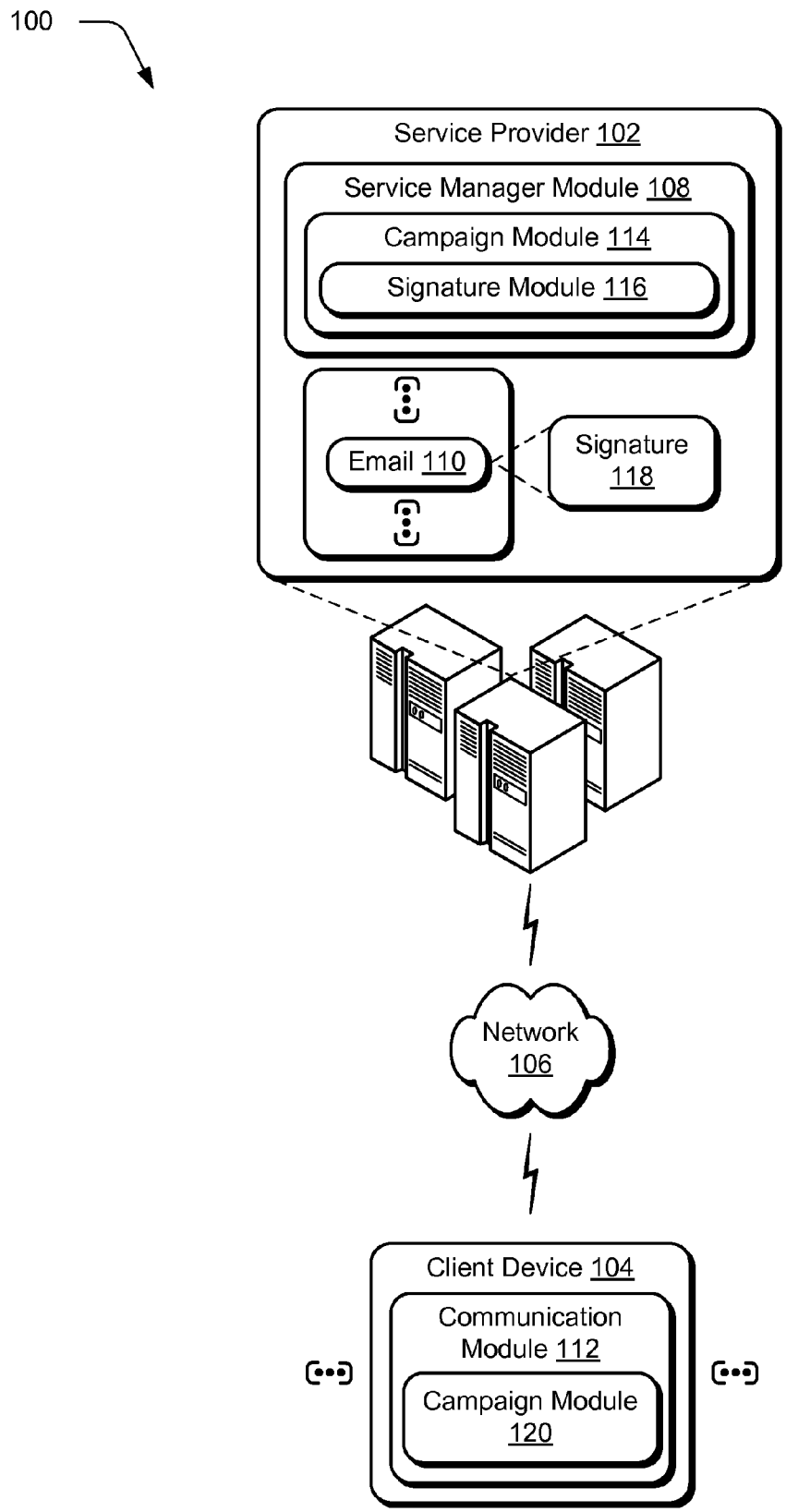
FIG. 1 is an illustration of an environment in an example implementation that is operable to employ campaign detection techniques.

FIG. 1 is an illustration of an environment 100 in an example implementation that is operable to employ campaign detection techniques. The illustrated environment 100 includes a service provider 102 and a client device 104 that are communicatively coupled over a network 106. The client device 104 may be configured in a variety of ways. For example, the client device 104 may be configured as a computing system that is capable of communicating over the network 106, such as a desktop computer, a mobile station, an entertainment appliance, a set-top box communicatively coupled to a display device, a wireless phone, a game console, and so forth. Thus, the client device 104 may range from full resource devices with substantial memory and processor resources (e.g., personal computers, game consoles) to a low-resource device with limited memory and/or processing resources (e.g., traditional set-top boxes, hand-held game consoles).

Although the network 106 is illustrated as the Internet, the network may assume a wide variety of configurations. For example, the network 106 may include a wide area network (WAN), a local area network (LAN), a wireless network, a public telephone network, an intranet, and so on. Further, although a single network 106 is shown, the network 106 may be configured to include multiple networks.

The service provider 102 is illustrated as including a service manager module 108 that is representative of functionality to provide a service that is accessible via the network. For example, the service manager module 108 may be configured to provide an email service to manage communication of email 110 via the network 106, such as to compose the email 110, send the email 110, receive the email 110, view the email, and so on. For example, the service manager module 108 may provide a service that is accessible via a browser over the network 106. In another example, the service manager module 108 may be hosted within an enterprise, e.g., to provide hosted email for a business or other organization. A variety of other examples are also contemplated. Although a single email 110 is illustrated for clarity in the environment 100, the email may be representative of one or more emails. Accordingly, the email 110 may be referenced in the following discussion in single (e.g., email 110) and plural (e.g., emails 110, the plurality of emails 110) forms.

To interact with the service provider 102, the client device 104 (and more particularly a user of the client device 104) may access a user account maintained by the service manager module 108 using a communication module 112. The communication module 112 is representative of functionality of the client device 104 to interact via the network 106, e.g., by using browser functionality. For example, the user account may be accessed with one or more login credentials, e.g., a user name and password. After verification of the credentials, a user of the client device 104 may interact with services provided by the service manager module 108, e.g., to interact with email 110.

As previously described, spammers may generate spam campaigns to cause the service provider 102 to send mass amounts of unsolicited email 110, i.e., spam. To combat these campaigns, the service manager module 108 is further illustrated as including a campaign module 114. The campaign module 114 is representative of functionality to detect spam campaigns and/or perform actions in response to this detection. For example, the campaign module 114 may employ a signature module 116 that is representative of functionality to generate a signature 118 from email 110 that describes the email. The signature 118 may be generated through analysis of keywords included in the email 110. A variety of other examples of signature 118 generation are also contemplated, further discussion of which may be found in relation to FIG. 2.

The signature 118 may then be leveraged by the campaign module 114 to determine similarity of emails 110, one to another. This similarity may then be used as a basis to detect a spam campaign without relying on "bad" qualities of the email 110. Although, it should be noted that those qualities may also be leveraged by the campaign module 114 to verify the detection of the campaign, further discussion of this and other verification techniques may be found in relation to FIG. 4.

Generally, any of the functions described herein can be implemented using software, firmware, hardware (e.g., fixed logic circuitry), manual processing, or a combination of these implementations. The terms "module," "functionality," and "logic" as used herein generally represent software, firmware, hardware, or a combination thereof. In the case of a software implementation, the module, functionality, or logic represents program code that performs specified tasks when executed on a processor (e.g., CPU or CPUs). The program code can be stored in one or more computer readable memory devices, such as a digital video disc (DVD), compact disc (CD), flash drive, hard drive, and so on. The features of the campaign detection techniques described below are platform-independent, meaning that the techniques may be implemented on a variety of commercial computing platforms having a variety of processors.

Figure 2:
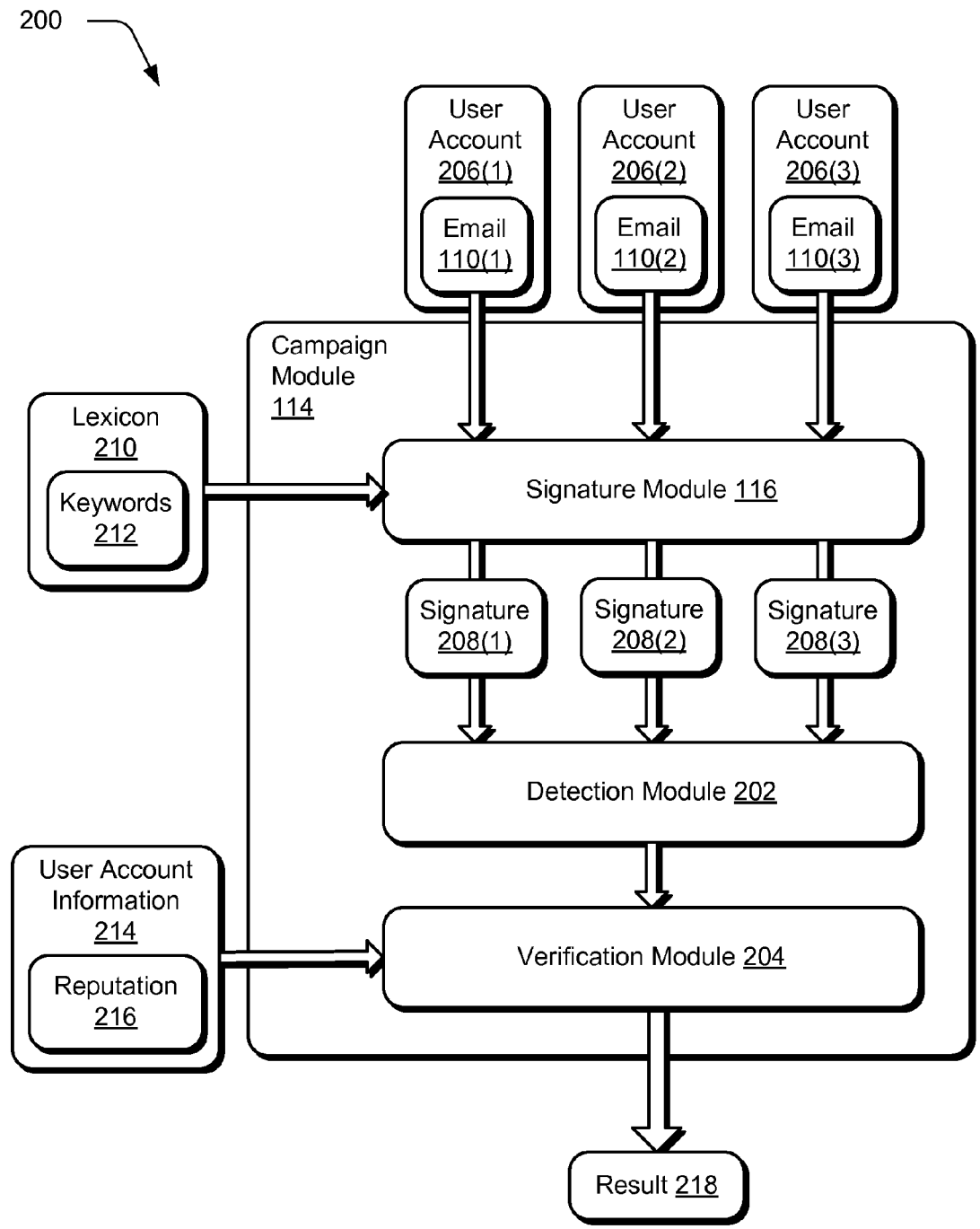
FIG. 2 is an illustration of a system in an example implementation showing a campaign module of FIG. 1 in greater detail.

FIG. 2 depicts a system 200 in an example implementation in which the campaign module 114 is shown in greater detail as computing a signature for emails to be used in campaign detection. Functionality of the campaign module 114 in this example is illustrated as being represented using three modules, the signature module 116 of FIG. 1, a detection module 202, and a verification module 204. The campaign module 114, and more particularly the signature module 116, is illustrated as receiving email 110(1), 110(2), 110(3) from corresponding user accounts 206(1), 206(2), 206(3).

In this example system 200, the first part of campaign detection involves a determination as to which emails 110(1)-110(3), if any, may be considered similar. It should be noted that spammers are proficient at randomizing email content to avoid detection. Consequently, an analysis that relies on the presence of similar phrases in the header (e.g., subject line) and/or body of the email may be insufficient. Accordingly, the signature module 115 may be employed to convert the emails 110(1)-110(3) into corresponding signatures 208(1), 208(2), 208(3).

In an implementation, the signatures 208(1)-208(3) capture unique parts of the emails 110(1)-110(3) while being robust to spammer tricks to randomize content in the emails 110(1)-110(3). For example, the signature module 116 may employ a lexicon 210 having keywords 212. Presence and/or absence of the keywords 212 in the emails 110(1)-110(3) may therefore be used as a basis for forming the signatures 208(1)-208(3). Additionally, the lexicon 210 may reference characteristics other than keywords 212, such as types of content, header information, and so on. In implementations, the signature module 116 may generate the lexicon 210 using machine learning or other techniques to identity which keywords 212 and other characteristics are typically included in spam.

In an implementation, one or more of the signatures 208(1)-208(3) are comprised of a plurality of signatures (which may be thought of as "sub-signatures") that are computed for portions of the respective emails 110(1)-110(3). That way, even if spammers randomize some portions of the email 110

(1)-110(3), some of the signatures will not change and may therefore be used to detect similarity. Thus, each of the signatures 208(1)-208(3) may be representative of one or more signatures that are computed for a single corresponding email 110(1)-110(3). Further discussion of signatures 208(1)-208(3) that are computed for portions of the emails 110(1)-110(3) may be found in relation to FIG. 3.

The signatures 208(1)-208(3) are then illustrated in the system 200 as being provided to the detection module 202. The detection module 202 is representative of functionality to track which emails 110(1)-110(3) are similar using the respective signatures 208(1)-208(3). For example, once the emails 110(1)-110(3) are mapped to a set of signatures 208(1)-208(3), the next step is to figure out which emails 110(1)-110(3) are similar using the detection module 202. For example, the detection module 202 may compute a score that describes similarity of two or more of the emails 110(1)-110(3) to each other. The score may then be compared with a threshold to determine if the emails 110(1)-110(3) have sufficient matching qualities to be considered similar.

The detection module 202 may then use this similarity to determine whether the emails 110(1)-110(3) have a likelihood of being part of a spam campaign. For example, spammers may employ optimized systems to send out a significant amount of spam in a relatively short period of time. Therefore, the detection module 202 may be tasked with looking for similar emails 110(1)-110(3) that show up in relatively large quantities relatively quickly, i.e., a "burst" of email as previously described. Accordingly, the detection module 202 may track the signatures 208(1)-280(3) and employ optimized storage to efficiently look up and match signatures 208(1)-208(3), one to another.

The campaign module 114 may leverage a variety of different statistics to detect a campaign. Examples of these statistics are described in the following table that also describes corresponding example scenarios.

| Statistic | Hijack Scenarios |
|---|---|
| Number of calendar days taken to finish 7 timeslices (e.g., 1 timeslice = 1 day of sent mail activity) | Evil Bob hijacks Joe's account to send out spam/malware. Instead of just Joe sending mail, now both Evil Bob and Joe will be sending mail using the account. Moreover, Evil Bob will send mail more frequently to maximize the ROI of the hijack. If the average number of calendar days taken to finish 7 timeslices is tracked, there would be a decrease in this value after the hijack, because higher frequency of sending mail → timeslices will be closer together in calendar time. |
| Number of login countries | 1. Joe occasionally travels internationally, but stays within U.S. most of the time. Evil Bob hijacks Joe's account by phishing his password. Evil Bob logs into Joe's account using a rented botnet which consists of infected machines spread around the world. Before the hijack, Joe logs in from 1 country every week. After the hijack, Joe + Evil Bob log in from couple of countries every week.<br>2. Matt's account is hijacked by a hijacker that uses a set of servers in China to send spam via hijacked accounts. Matt lives in the US and has never travelled to China. Before the hijack, Matt's account had one login country every week. After the hijack, the account has two login countries - China and US - each week. |
| Number of NDRs | Pam regularly sends email from her account. A couple of times a month she gets an NDR because she mistyped an email address or forgot to update her address-book. Evil Bob hijacks her account and starts sending spam messages to people on her address-book as well other addresses. There is a drastic increase in the number of NDRs Pam receives on a weekly basis. |
| Percentage of spam mails | 1. Spam filters may have ~1% FP rate. Joe is a moderate user - sends a few mails every week. So, on average Joe has ~0% spam mails per day. Evil Bob hijacks the account and starts using it to send out lot of spam mails everyday causing Joe's % spam mails sent per day to become >50%.<br>2. Typically, Matt sends out few Forwards so his mails are typically not caught by campaign detection. Evil Bob hijacks Matt's account and uses it to spread malware. All the mails Evil Bob sends are nearly identical to each other and to emails Evil Bob sends using the other accounts he's hijacked. The percentage of mails sent from Matt's account that involves campaigns increases after the hijack. |
| Sent mail volume | Like other ordinary email users, Steve sends a few mails from his account every week. However, after Evil Bob hijacks his account, he uses it to blast out as much spam as he can. Now, several mails are sent from the account every day. The sudden jump in sent mail volume is a good indicator of spam. |
| Number of send-only entries | Joe sends most of his mail to friends and family and occasionally sends out emails to other email addresses. Thus, the number of send-only entries doesn't change much on a daily basis. After Evil Bob hijacks Joe's account, he uses it to send out emails to addresses he harvested from the Internet. There's a sharp rise in number of send-only entries. |
| Number of User Complaints | Pam regularly sends mail from her account. Sometimes she sends out forwards, which some people do not like and classify as junk, leading to a complaint logged against Pam's account. However, the weekly average of these complaints is very small. Evil Bob hijacks her account and starts sending spam messages. Pam starts getting a significantly larger number of complaints. |
| Number of login IP subnets | Joe lives in the US and typically logs into his email account from home and work. So, in the average week his account shows logins from 2 IP subnets. Evil Bob hijacks Joe's account by phishing his password. Evil Bob logs into Joe's account using a rented botnet consisting of US machines. Suddenly Joe's account shows logins from many different subnets, which is an indicator of hijack. |
| Number of character sets | Matt speaks English so each of his mails typically have the US-ASCII character set. His account gets hijacked by a Turkish spammer group. The hijackers use the account to send out spam advertising Turkish dating sites. The spam is in Turkish so has a completely different character set. The number of character sets in emails sent from Matt's account changes from 1 to 2 indicating hijack. |
| Number of User-agent strings | Steve typically logs into his email account from home and work. Steve uses a first type of browser at work and a second type of browser at home, so in the average week his account shows logins from two different User-agents. Evil Bob hijacks Steve's account by phishing his password. Evil Bob logs into Steve's account from different computers, which are all running a third type of browser, such as a previous version of the first type of browser. The change in number of user-agent strings logging into Steve's account indicates hijack. |

| Statistic | Hijack Scenarios |
|---|---|
| Length of subject headers | Like other typical users, Chris bases his email subjects on the content of the emails. Thus, the subjects vary widely in length from one email to another. However, his account may get hijacked by a spammer. The scripts that the Spammer uses to generate spam emails do not employ completely random subjects, e.g., most emails have subjects like "Dear Friend", "Hi', and so on. Thus the length of subjects varies less after the hijack, compared to before. By comparing the median of the length of subjects, the potential hijack may be identified. |
| Sent-mail times | Tracing when email is sent, similar to tracking when a user logs in as described in the subsequent discussion. |
| Number of Zero-Conversation entries | Hijackers send spam/malware to lot of different addresses from which responses are not received. |
| Percentage of sent emails containing URLs | Included as part of sent mail content statistic. |
| Percentage of sent mails containing attachments | Spam mails generally do not generally contain attachments and therefore this may be an indication of a malicious campaign. |
| Number of bucket changes | Hijacked accounts tend to stay "Good," i.e. no bucket changes regarding reputation, and therefore changes to reputation may be indicative of spam. |
| Mail sent to Address Book contacts | This is indicative of a likelihood of an email being legitimate versus spam. |
| Number of unique signatures | Included as part of sent mail content statistic. |

The campaign module 114 may then employ a verification module 204 to minimize false-positives. For example, there may be instances of legitimate emails that are similar and that are sent in relatively large amounts over a relatively short period of time, such as chain letters, legitimate marketing communications (e.g., confirmations), links to popular media (e.g., online videos), and so on. In implementations, the verification module 204 minimizes false positives by employing user account information 214. For example, the user account information 214 may describe users that are sending the emails for use as verification as to the legitimacy or "spamminess" of the campaign. The user account information 214 may also describe a variety of other data that pertains to the user account, such as an age of the user account, past activity of the user account, geographic locations that are used to login to the user account, and so on.

The user account information 214, for instance, may include a reputation 216 that classifies the user accounts 206(1)-206(3) into "good," "suspicious," and "bad" based on account activity. Therefore, this reputation 216 may serve as a basis to validate legitimacy of the user accounts 206(1)-206(3).

For example, email campaigns that are mainly generated via "good" user accounts 206(1)-206(3) may be ignored. Therefore, the focus may be placed on emails 110(1)-110(3) generated by "suspicious" and/or "bad" user accounts 206(1)-206(3). The verification module 204, for instance, may employ logic to balance between mitigating false-positives and maintaining the effectiveness of the campaign detection techniques described herein. A result 218 of this verification may then be output and serve as a basis to perform one or more actions.

A variety of other information may also be leveraged by the campaign module 114 that may be considered "indirect" campaign quality information. For example, the percentage of recipients that consider the campaign spam, e.g., by clicking on a "Report as Junk" button. In another example, the percentage of recipients that interact with the email, e.g., "click on links" as determined by browser telemetry may be indicative of spam, whereas spammers are likely to see large volume of URLs that are rarely "clicked." Similar data can be obtained from DNS servers in ISPs.

In a further example, feedback from receiving organizations that may reject the emails may be used to mark the campaign as "bad" or "legitimate." In yet another example, the language of the campaign may not match with the broad distribution of the sending IPs/sending accounts. In this case, for example, botnets may enroll a multitude of computing devices around the world, and therefore it may be suspicious if each of them sends a rather large number of emails in English. Yet further, human grading may be employed in which the email is delayed outbound to permit a human grader to look at few sample messages and decisively block or "let go" of large volume of matching emails. Further discussion of these techniques may be found in relation to the following procedures.

Example Procedures

The following discussion describes campaign detection techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the system 200 of FIG. 2.

Figure 3:
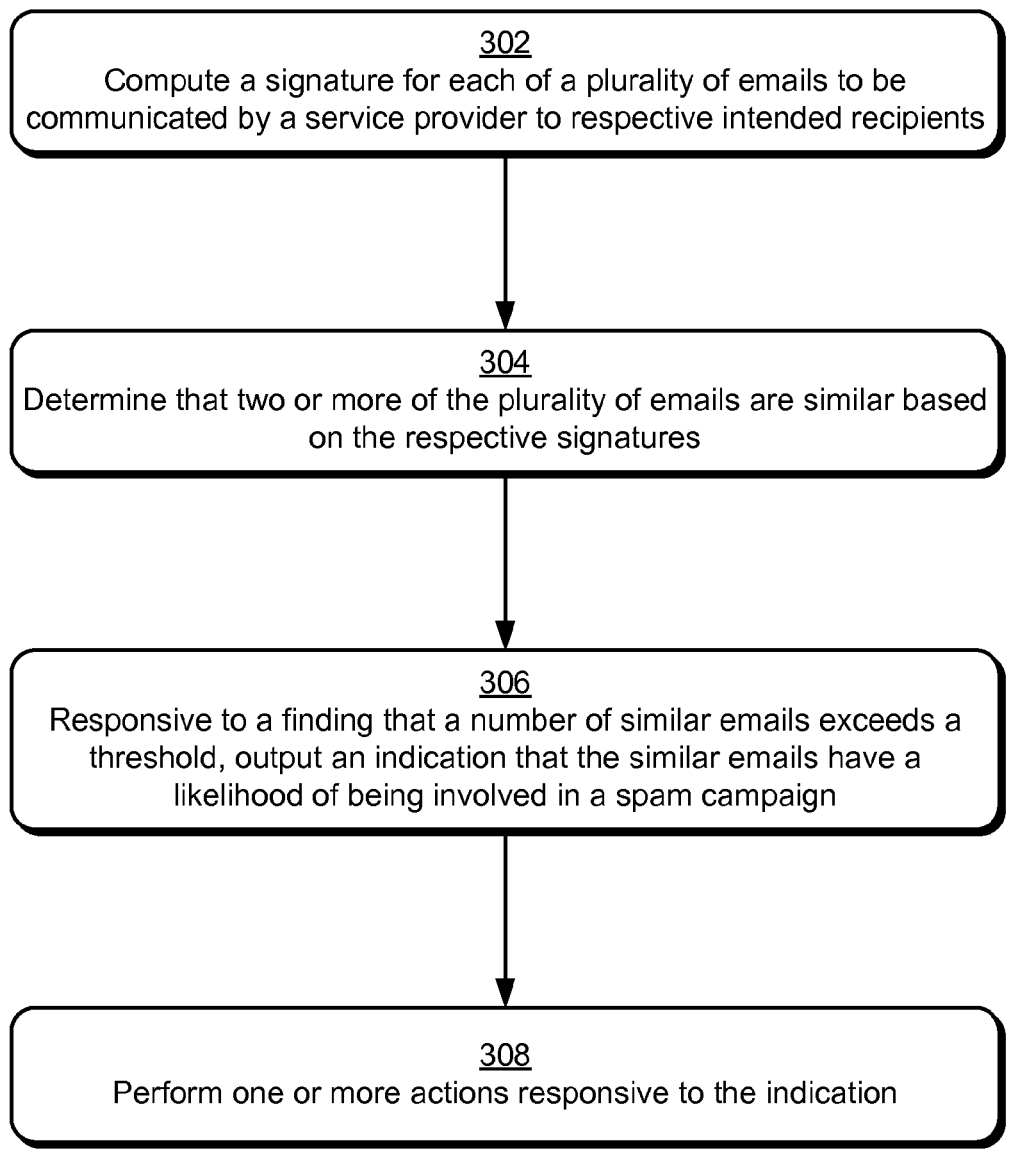
FIG. 3 is a flow diagram depicting a procedure in an example implementation in which a signature is computed and used to determine similarity of emails, a number of which is to serve as a basis to detect a spam campaign.

FIG. 3 depicts a procedure 300 in an example implementation in which a signature is computed and used to determine similarity of emails, a number of which is to serve as a basis to detect a spam campaign. A signature is computed for each of a plurality of emails to be communicated by a service provider to respective intended recipients (block 302). As previously described, the signature 208(1) may be computed from an email 110(1) using a lexicon 210 of keywords 212, computed from header information of the email 110(1), and so on.

Additionally, the signature 208(1) may be composed of signatures that are computed for parts of the emails 110(1). For example, the signature module 116 may parse the email 110(1) to form a plurality of portions. Signatures may then be computed from the portions to compose an overall signature for the email. A variety of other examples are also contemplated.

A determination is made that two or more, of the plurality of emails, are similar based on the respective signatures (block 304). The similarity may be computed using a score and threshold or other techniques based on the signatures. Through use of the signatures 208(1)-208(3), the similarity may be computed in real time by the campaign module 114.

Responsive to a finding that a number of similar emails exceeds a threshold, an indication is output that the similar emails have a likelihood of being involved in a spam campaign (block 306). The detection module 202, for instance, may employ a threshold that is based on an amount of time and a number of emails. Therefore, if the number of emails sent in an amount of time exceeds the threshold, then the detection module 202 may output an indication that there is a likelihood that these emails are part of a spam campaign. For instance, the indication may be output to the verification module 204 to perform a verification using user account information 214, may be output in a user interface, and so on.

One or more actions are performed responsive to the indication (block 308). For example, the campaign module 114 may be configured to prevent communication of one or more of the similar emails from the service provider 102, quarantine user accounts, and so on as mentioned above. Thus, in this example the similarity of emails is used to detect a possible spam campaign and may do so without relying on "bad" content and/or actions on the part of the spammer. However, it should be readily apparent that the similarity may also be leveraged with other techniques to detect a spam campaign, further discussion of which may be found in relation to the following figure.

Figure 4:
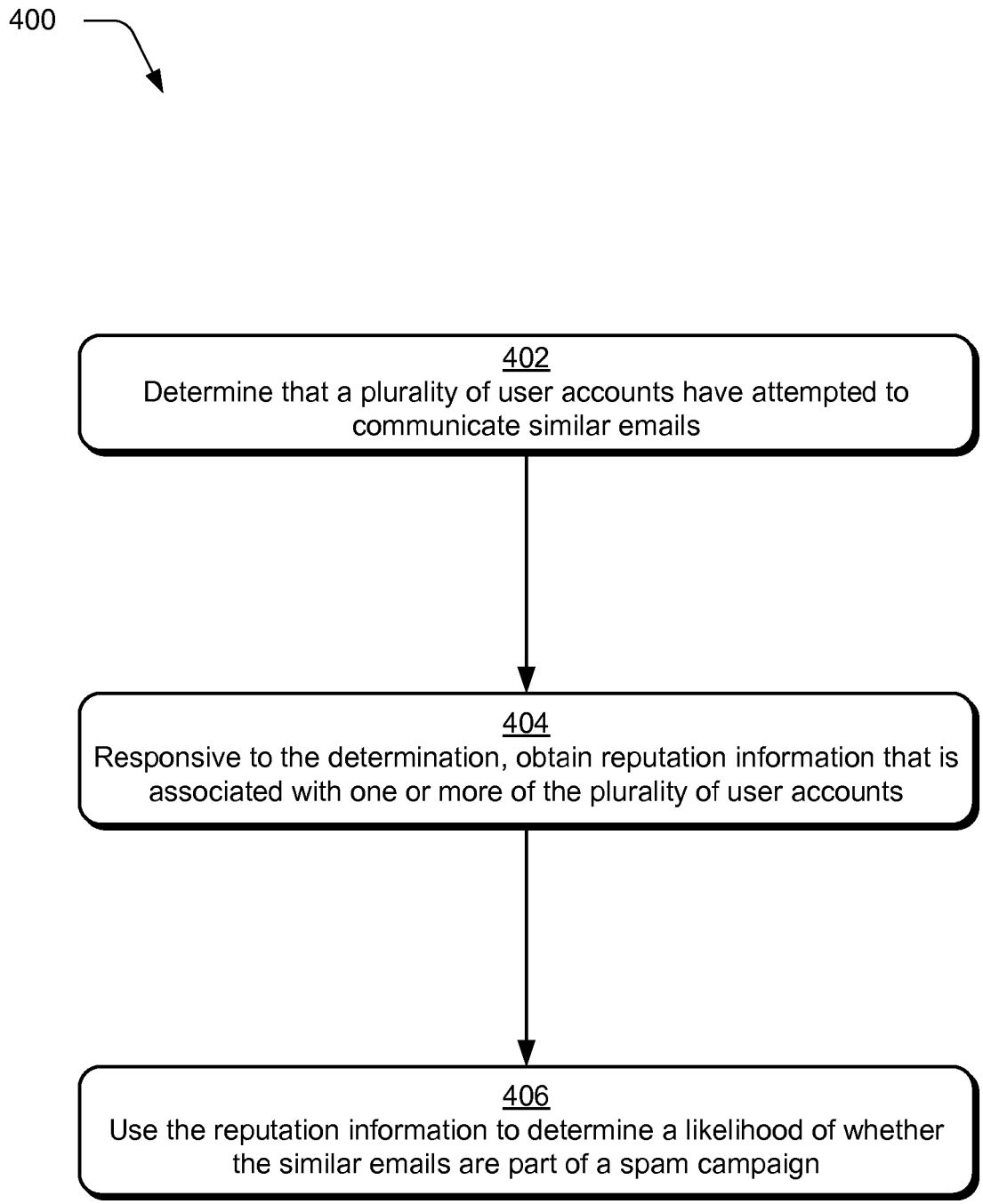
FIG. 4 is a flow diagram depicting a procedure in an example implementation in which reputation information is leveraged to determine whether similar emails have a likelihood of being part of a spam campaign.

FIG. 4 depicts a procedure 400 in an example implementation in which reputation information is leveraged to determine whether similar emails have a likelihood of being part of a spam campaign. A determination is made that a plurality of user accounts has attempted to communicate similar emails (block 402). This determination may be performed in a variety of ways, such as by using signatures as previously described as well as other techniques, e.g., through brute force comparison of emails.

Responsive to the determination, reputation information is obtained that is associated with one or more of the plurality of user accounts (block 404). The reputation information is used to determine a likelihood of whether the similar emails are part of a spam campaign (block 406). For example, the reputation 216 information may describe whether the user account 206(1), 206(2), 206(3) is considered "good," "suspicious," or "bad." Therefore, verification of the kind of user accounts that are used to send the emails may be used to reduce and even eliminate false positives that are generated for legitimate email campaigns. A variety of other user account information 214 and other information may also be leveraged by the verification module 204 without departing from the spirit and scope thereof.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by one or more modules at least partially in hardware, the method comprising:
computing a signature for each of a plurality of outgoing emails to be sent by a service provider to respective intended recipients;
determining that two or more of the plurality of outgoing emails are similar based on the respective signatures;
responsive to a finding that a number of similar said outgoing emails exceeds a threshold, outputting an indication that the similar said outgoing emails have a likelihood of being involved in a spam campaign;
and responsive to the indication, obtaining information from one or more user accounts that correspond to the similar outgoing emails, the information comprises a number of character sets, a number of user agent strings, statistical information, sent email times, or a number of zero-conversation entries.

2. A method as described in claim 1, wherein the computing of the signatures is based at least in part on keywords included in respective said outgoing emails.

3. A method as described in claim 1, wherein the computing of the signatures is based at least in part on header information included in respective said outgoing emails.

4. A method as described in claim 1, wherein the computing comprises:
parsing a respective said email into a plurality of portions; and
computing a signature for two or more of the plurality of portions such that the signature for the respective said outgoing email is comprised of a plurality of the signatures for at least the two or more portions of the respective said outgoing email.

5. A method as described in claim 1, wherein the determining comprises:
calculating a score that describes relative similarity of the two or more said outgoing emails, one to another; and
ascertaining through comparison of the score with a similarity threshold that the two or more said outgoing emails are similar.

6. A method as described in claim 1, wherein the information describes an age of corresponding said user accounts.

7. A method as described in claim 1, wherein the information describes past activity of corresponding said user accounts.

8. A method as described in claim 1, wherein the information describes a reputation associated with a respective said user account.

9. A method as described in claim 1, wherein the information describes geographic locations that are used to login to a respective said user account.

10. A method as described in claim 8, further comprising using the reputation information to determine a likelihood of whether the similar outgoing emails are part of the spam campaign.

11. A method as described in claim 1, further comprising responsive to the indication, determining the likelihood that the similar outgoing emails are part of the spam campaign based on a number of the similar outgoing emails that were to be communicated in a particular amount of time.

12. A method as described in claim 1, further comprising performing one or more actions responsive to the indication.

13. A method as described in claim 1, wherein at least one said action is configured to prevent sending of one or more of the similar outgoing emails from a service provider that performs the computing, the determining, and the outputting automatically and without user intervention.

14. A method comprising:
executing computer program instructions on a processor of a computer system to perform operations comprising:
determining that a plurality of user accounts, hosted by a service provider, have attempted to send similar outgoing emails;
responsive to the determination, obtaining information that is associated with one or more of the plurality of user accounts, the information comprising a number of character sets, a number of user agent strings, statistical information, sent email times, or a number of zero-conversation entries; and
determining, using the information, a likelihood of whether the similar outgoing emails are part of a spam campaign.

15. A method as described in claim 14, wherein the determining is performed based on signatures that have been computed for the emails.

16. A method as described in claim 15, wherein at least one said signature is computed by:
parsing a respective said outgoing email into a plurality of portions; and
computing a signature for two or more of the plurality of portions such that the signature for the respective said outgoing email is comprised of a plurality of the signatures for at least the two or more portions of the respective said outgoing email.

17. A method implemented by one or more modules at least partially in hardware, the method comprising:
   computing a plurality of signatures for an outgoing email, to be sent by a service provider, each said signature corresponding to a respective portion of the outgoing email;
   comparing the plurality of signatures to other signatures computed for other portions of other outgoing emails;
   determining a similarity of the outgoing emails, one to another, based on the comparison;
   responsive to the determination, obtaining information that is associated with user accounts that correspond to the similar outgoing emails, the information comprising a number of character sets, statistical information, a number of user agent strings, sent email times, or a number of zero-conversation entries;
   determining, using the information a likelihood of whether the similar outgoing emails are part of a spam campaign; and outputting a result of the determining.

18. A method as described in claim 17, further comprising performing one or more actions responsive to the result.

19. A method as described in claim 18, wherein at least one said action is configured to prevent sending of one or more of the similar outgoing emails from a service provider that performs the computing, the determining, and the outputting automatically and without user intervention.

20. A method as described in claim 18, wherein the determining comprises:
   calculating a score that describes relative similarity of the outgoing email and the other outgoing emails, one to another; and
   ascertaining through comparison of the score with a similarity threshold that the outgoing email and the other outgoing emails are similar.

* * * * *